US012349790B2

(12) United States Patent
Cameron

(10) Patent No.: US 12,349,790 B2
(45) Date of Patent: Jul. 8, 2025

(54) HAZARDOUS MATERIAL STORAGE SHED SYSTEM

(71) Applicant: David Cameron, Lower Beechmont (AU)

(72) Inventor: David Cameron, Lower Beechmont (AU)

( * ) Notice: Subject to any disclaimer, the term of this patent is extended or adjusted under 35 U.S.C. 154(b) by 119 days.

(21) Appl. No.: 18/387,909

(22) Filed: Nov. 8, 2023

(65) Prior Publication Data

US 2025/0143456 A1 May 8, 2025

(51) Int. Cl.
*A47B 81/00* (2006.01)
*E05B 65/52* (2006.01)

(52) U.S. Cl.
CPC .............. *A47B 81/00* (2013.01); *E05B 65/52* (2013.01)

(58) Field of Classification Search
CPC ................................ A47B 81/00; E05B 65/52
See application file for complete search history.

(56) References Cited

U.S. PATENT DOCUMENTS 3,884,163 A * 5/1975 Ankersen .................. F23G 5/46 110/242
4,838,418 A 6/1989 Teixeira
5,036,829 A * 8/1991 Woo ........................ F24H 3/087 122/18.4
5,117,997 A 6/1992 Fink
5,982,267 A * 11/1999 Locht ..................... H02B 11/26 337/186
6,152,672 A 11/2000 Alson
10,144,583 B2 12/2018 Monaco
10,926,306 B2 2/2021 Muller
2017/0362072 A1* 12/2017 Garcia ..................... B67D 1/00

FOREIGN PATENT DOCUMENTS

WO WO9511511 4/1995

* cited by examiner

*Primary Examiner* — Amy J. Sterling

(57) ABSTRACT

A storage shed system for storing hazardous waste materials includes a pair of water tanks that are spaced from each other. A housing has a front wall that is attached to and extends between a pair of side walls, a back wall, and a pair of arcuate walls that is attached to and extends between the back wall and the pair of side walls, defining an interior space having top and bottom surfaces. Each of the pair of arcuate walls has a shape that is complementary to a shape of the pair of water tanks. Each of the pair of arcuate walls thus contacts one of the pair of water tanks when the housing is positioned between the pair of water tanks. A doorway is positioned in the front wall. A door is movably coupled to the doorway.

17 Claims, 8 Drawing Sheets

HAZARDOUS MATERIAL STORAGE SHED SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storage sheds and more particularly pertains to a new storage shed for storing hazardous waste and other materials.

(2) Description of Related Art Including Information Disclosed Under 37 CFR 1.97 and 1.98

The prior art relates to storage sheds. More particularly, the prior art relates to storage sheds and other containers for storing hazardous materials and hazardous waste. Hazardous substances are often used in conjunction with water tanks, particularly on rural properties, large acreage properties or off-grid properties that may either be disconnected from a municipal water system or require additional water. Hazardous materials such as corrosive chemicals and gasoline may be required for cleaning the water tanks. People who live on such properties may also require hazardous materials for other purposes, such as fuel for vehicles or equipment, or solvents or pesticides for farming and other agricultural practices. Thus, there is a need for a convenient space to safely store hazardous materials and waste products used in conjunction with water tanks.

BRIEF SUMMARY OF THE INVENTION

An embodiment of the disclosure meets the needs presented above by generally comprising a pair of water tanks that are spaced from each other on a surface. A housing has a front wall that is attached to and extend between a pair of side walls, a back wall, and a pair of arcuate walls that are attached to and extend between the back wall and a respective one of the pair of side walls to define an interior space having a top surface and a bottom surface. Each of the pair of arcuate walls has a shape that is complementary to a shape of a respective one of the pair of water tanks. Each of the pair of arcuate walls thus contacts the respective one of the pair of water tanks when the housing is positioned on the surface between the pair of water tanks. A doorway is positioned in the front wall to permit access to the interior space. A door is movably coupled to the doorway. The door is positionable to cover the doorway to inhibit access to the interior space.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
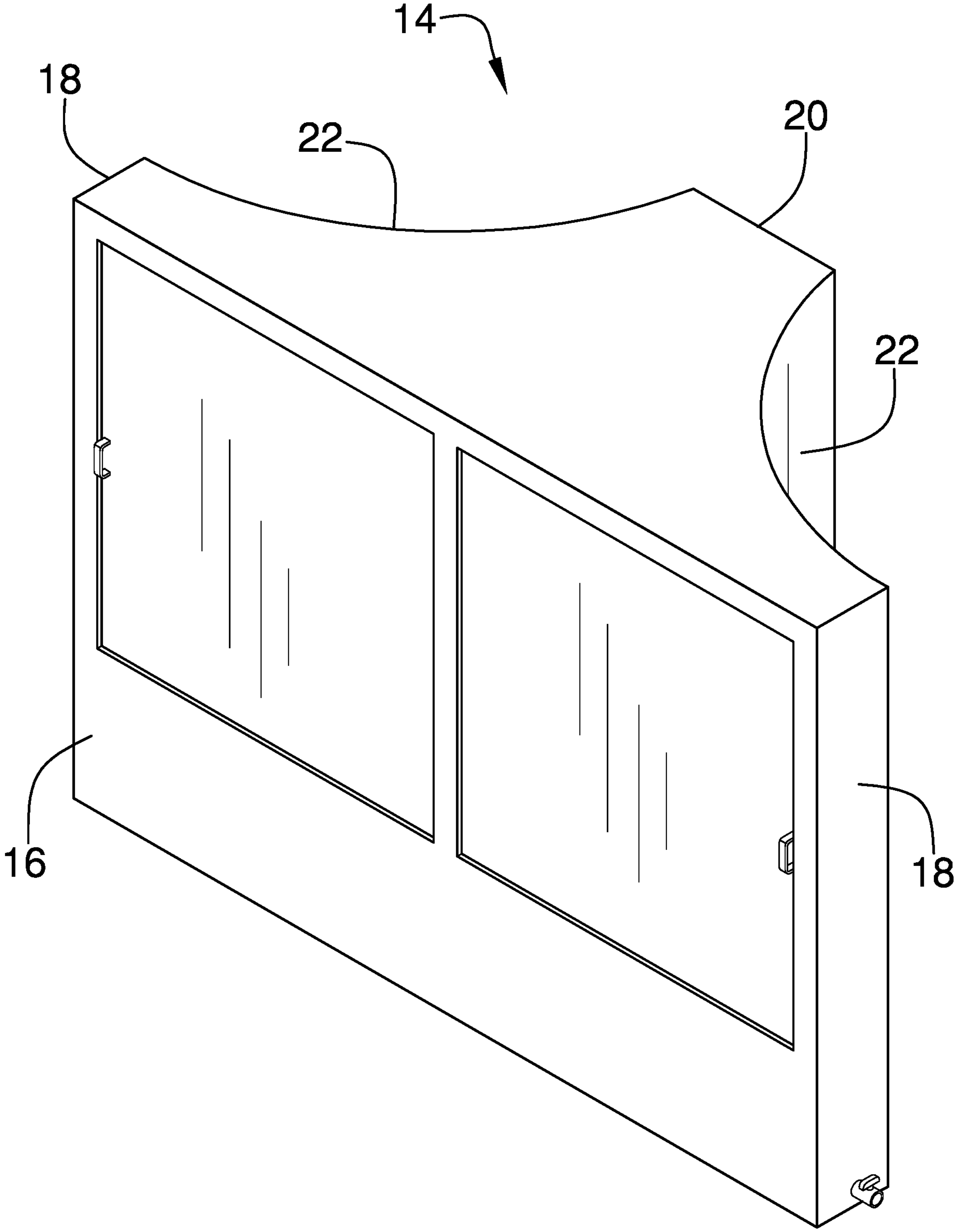
FIG. 1 is a front isometric view of a hazardous material storage shed system according to an embodiment of the disclosure.
Figure 2:
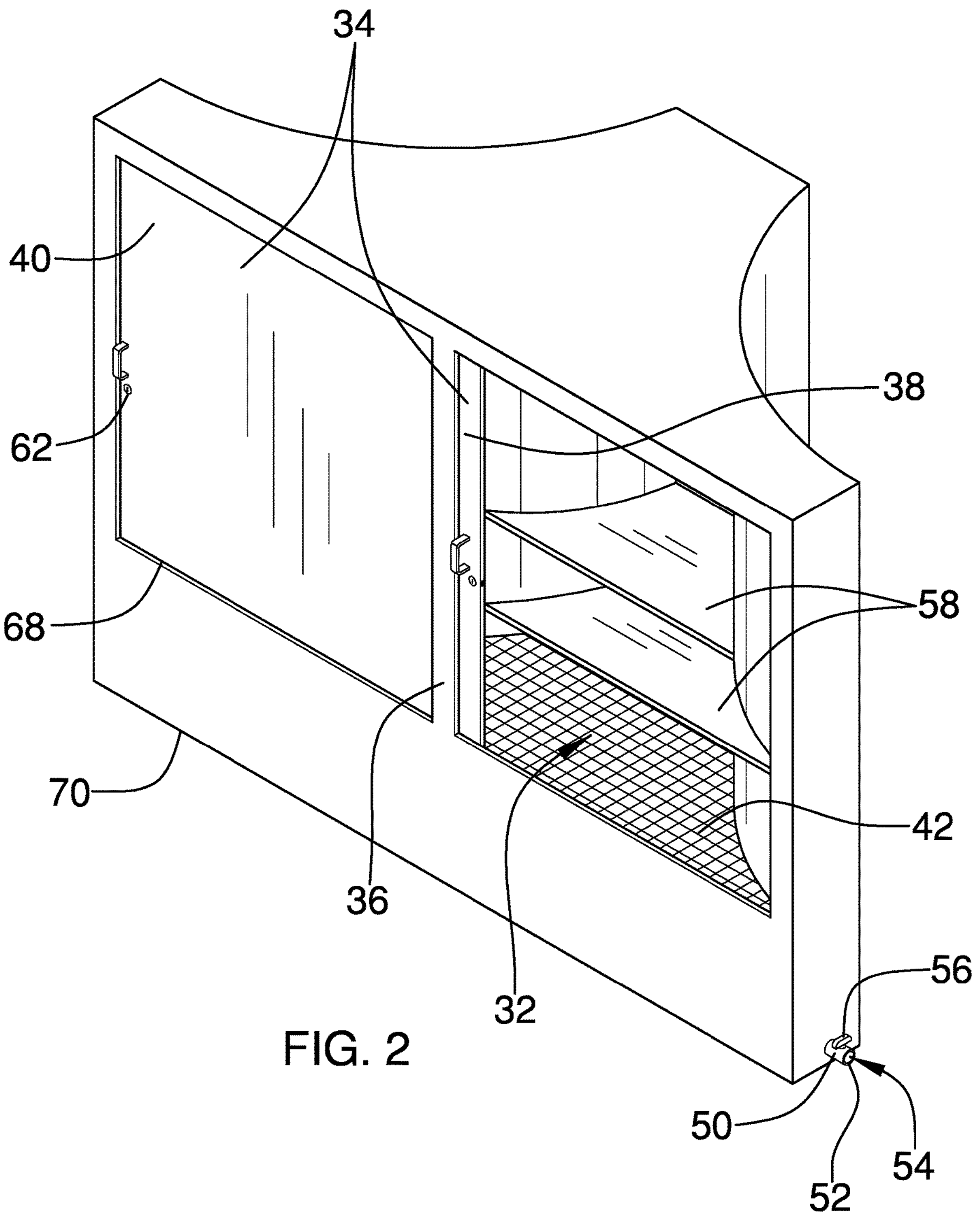
FIG. 2 is a front isometric view of an embodiment of the disclosure.
Figure 3:
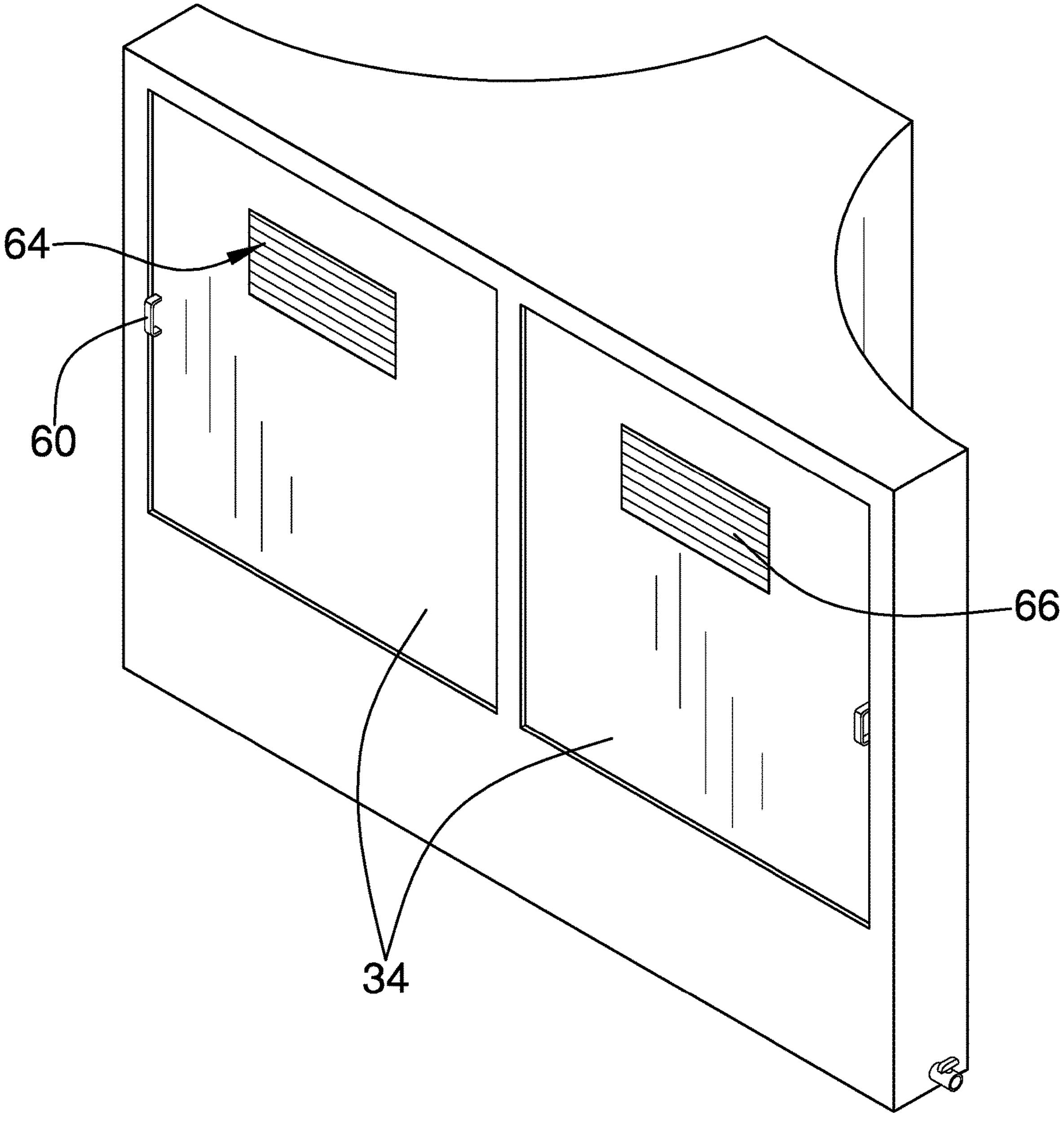
FIG. 3 is a front isometric view of an embodiment of the disclosure.
Figure 4:
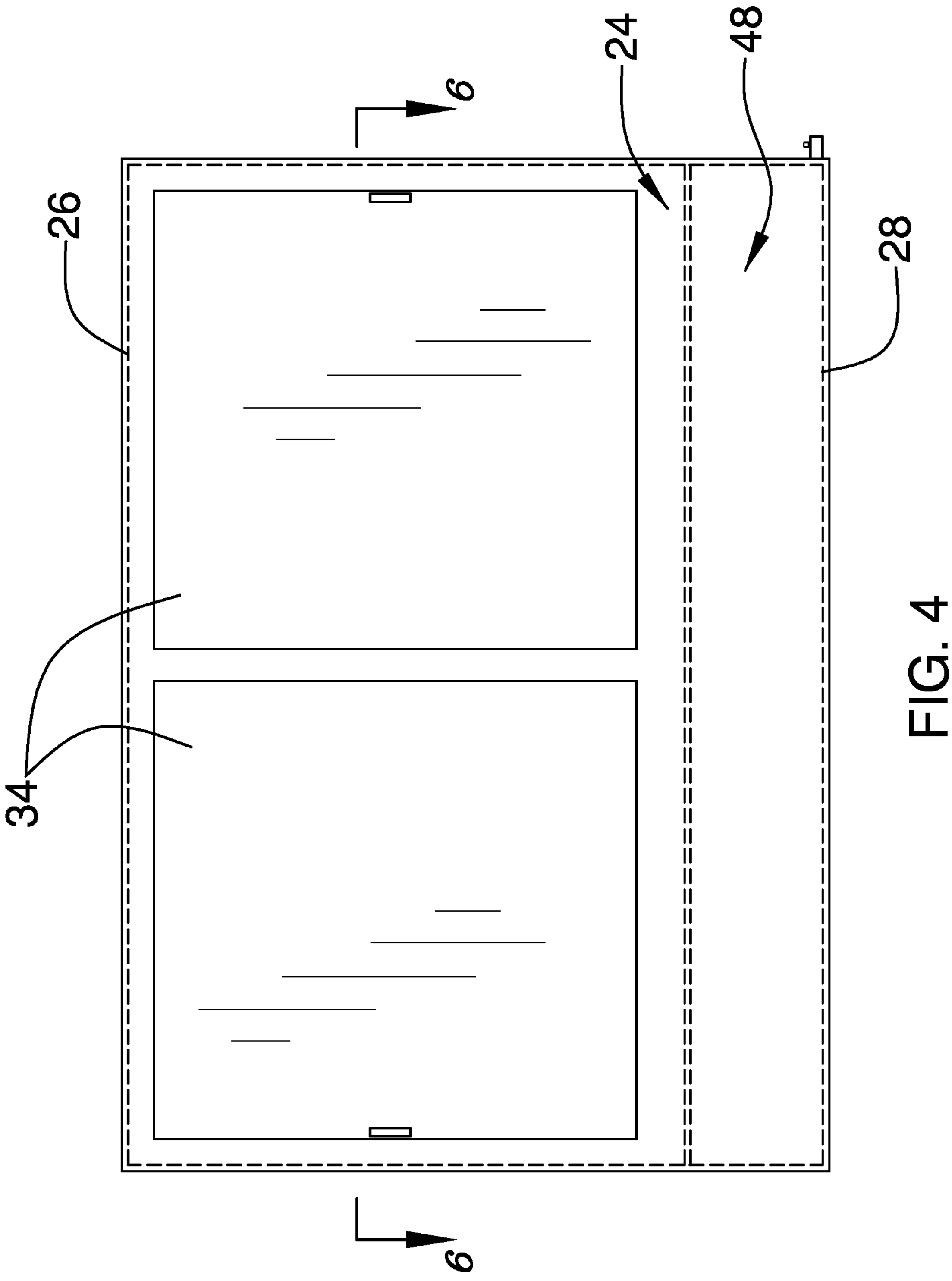
FIG. 4 is a front view of an embodiment of the disclosure.
Figure 5:
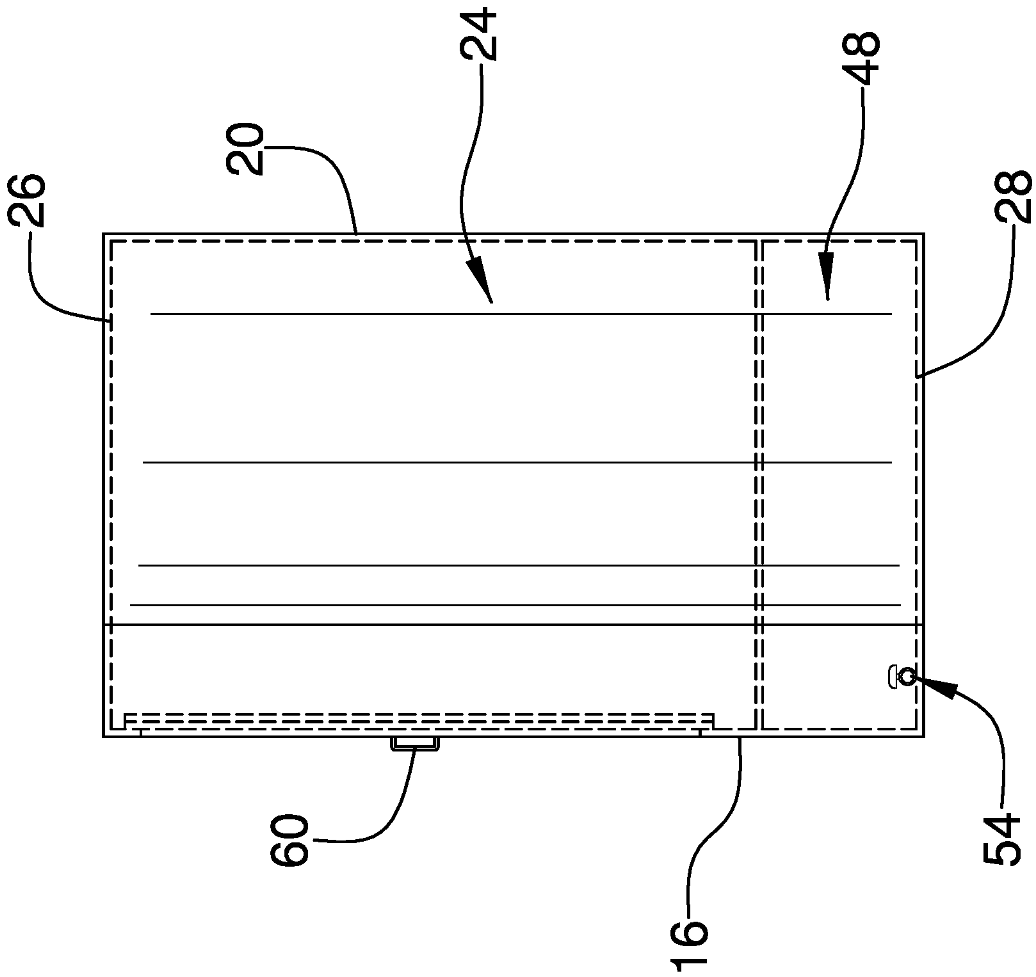
FIG. 5 is a side view of an embodiment of the disclosure.
Figure 6:
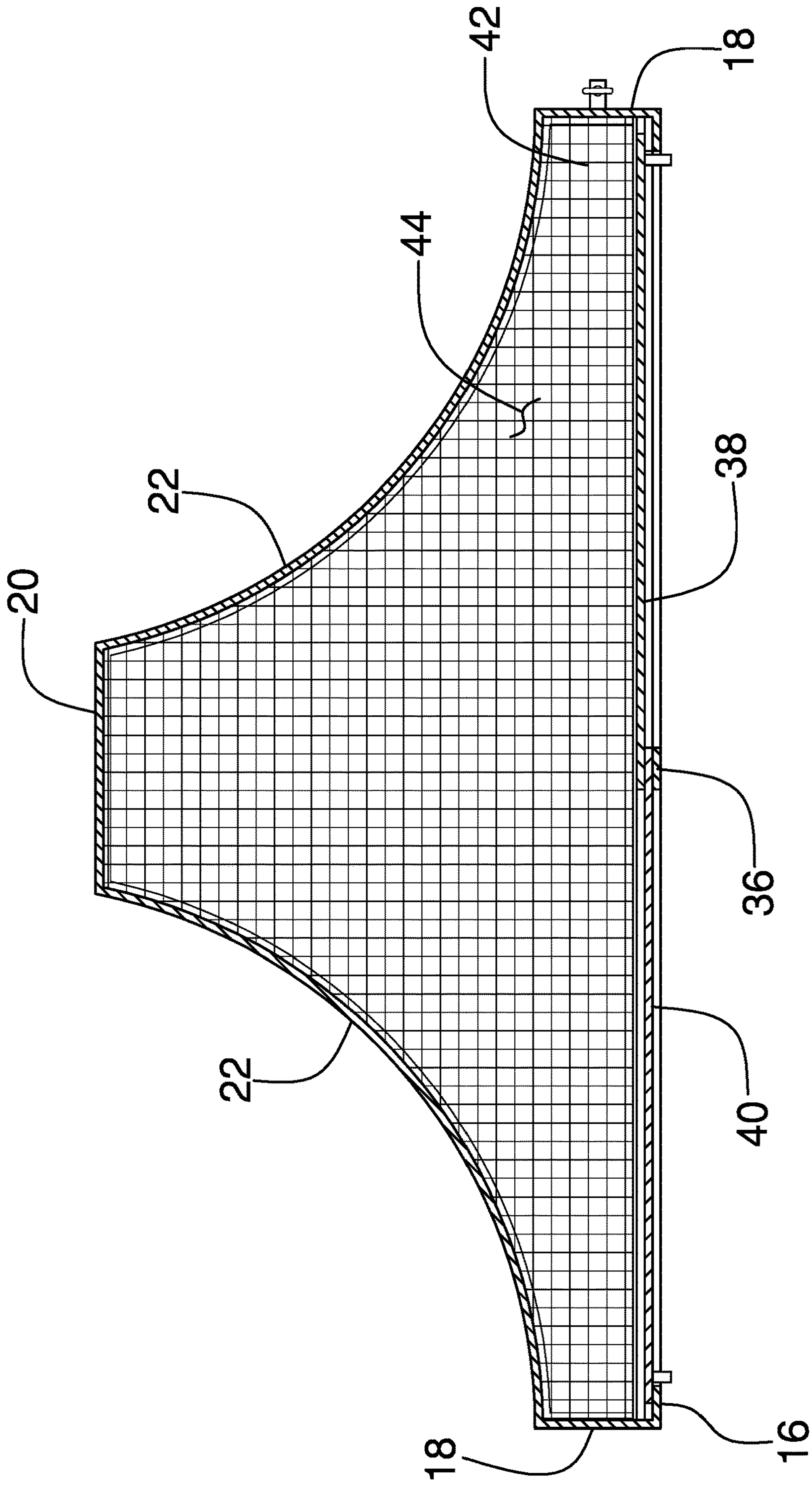
FIG. 6 is a cross-sectional view of an embodiment of the disclosure.

With reference now to the drawings, and in particular to FIGS. 1 through 8 thereof, a new storage shed embodying the principles and concepts of an embodiment of the disclosure and generally designated by the reference numeral 10 will be described.

As best illustrated in FIGS. 1 through 8, the hazardous material storage shed system 10 generally comprises a pair of water tanks 12. Each tank of the pair of water tanks 12 is generally spaced from the other. In some embodiments, each of the pair of water tanks 12 may be cylindrical.

Figure 7:
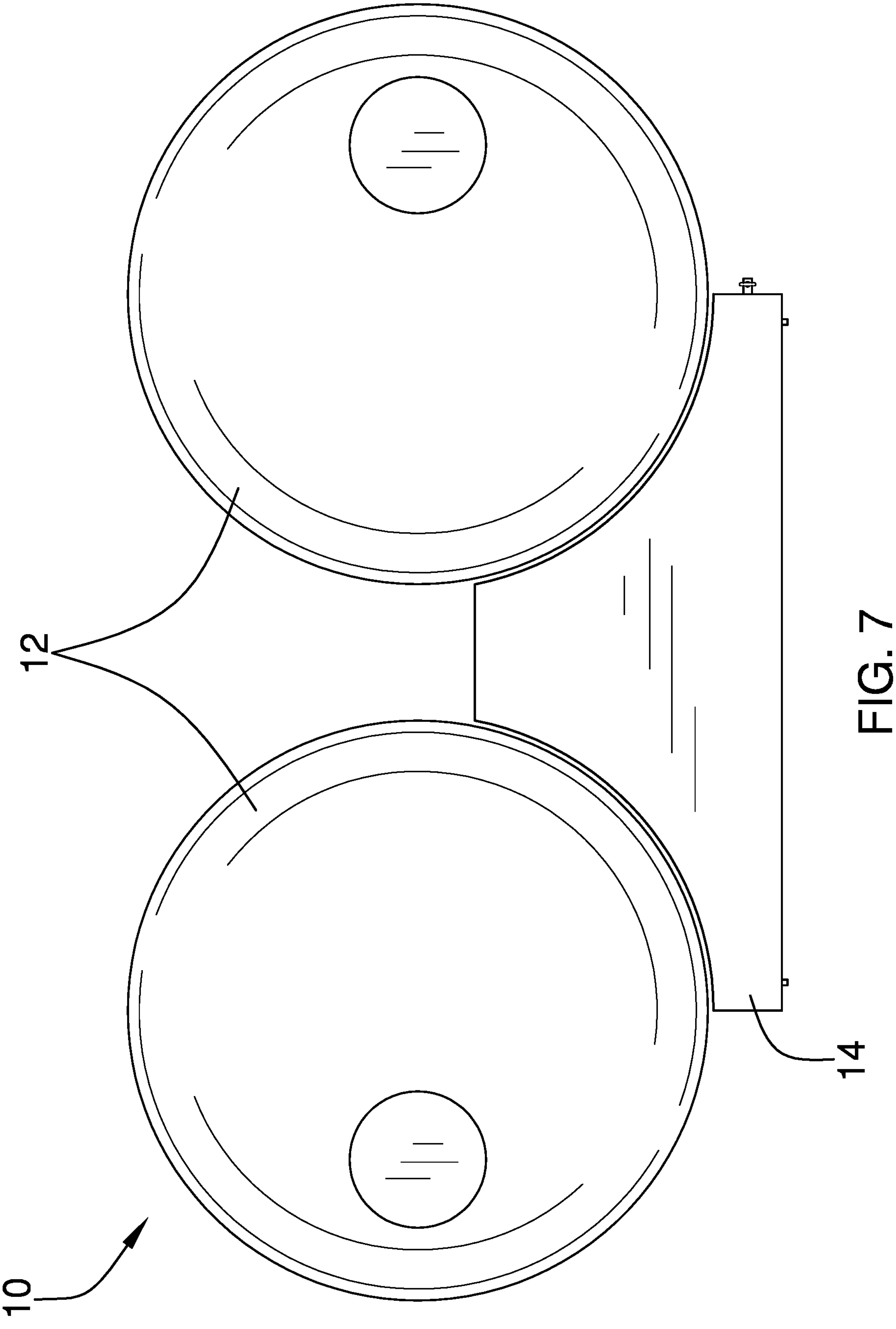
FIG. 7 is a top view of an embodiment of the disclosure.
Figure 8:
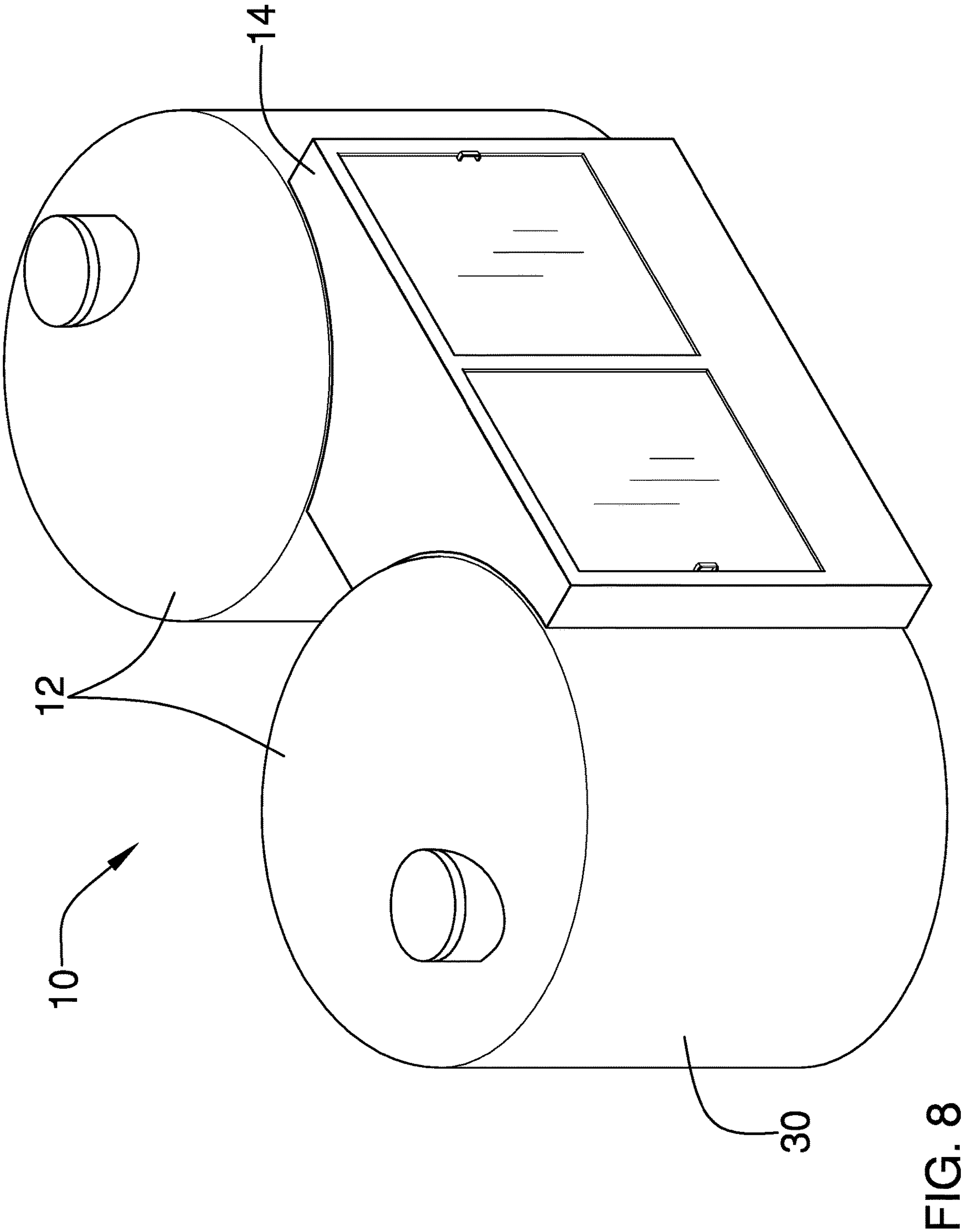
FIG. 8 is an in-use view of an embodiment of the disclosure.

A housing 14 has a front wall 16 that is attached to and extends between a pair of side walls 18. The housing 14 also has a back wall 20 that is attached to and extends between a pair of arcuate walls 22. The pair of arcuate walls 22 is attached to and extends between the back wall 20 and a respective one of the pair of side walls 18 to define an interior space 24. The interior space 24 generally includes a top surface 26 and a bottom surface 28. Each of the pair of arcuate walls 22 has a shape that is complementary to a shape of a respective one of the pair of water tanks 12. For example, when each of the pair of water tanks 12 has a cylinder shape with a convexly arcuate perimeter wall 30, each of the pair of arcuate walls 22 is concavely arcuate between the back wall 20 and the respective one of the pair of side walls 18. The housing 14 is therefore configured to be positionable in the space between the pair of water tanks 12, as shown in FIGS. 7 and 8, with each of the pair of arcuate walls 22 being positioned adjacent to, or aligned with, the respective one of the pair of water tanks 12. For example, each of the pair of arcuate walls 22 may contact the convexly arcuate perimeter wall 30 of the respective one of the pair of water tanks 12 when the housing is positioned between the pair of water tanks 12.

The housing 14 may comprise a plastic material. In some embodiments, the housing 14 and the pair of water tanks 12 may comprise the same plastic material because the housing 14. For example, both housing 14 and the pair of water tanks 12 may comprise a polyethylene material because it is a non-corrosive, lightweight, durable plastic which is designed for long life and is impact resistant. Other materials may also be used, as long as the materials are safe for storing hazardous materials such as corrosives, flammables, and combustibles.

A base panel 42 may be positioned in the interior space 24. An upper surface 44 of the base panel 42 is generally elevated over the bottom surface 28 of the interior space 24. A lower surface of the base panel 42 is generally spaced from the bottom surface 28 thereby defining a well 48 between the lower surface of the base panel 42 and the bottom surface 28 of the interior space 24. Embodiments of the base panel 42 may comprise a mesh material whereby a fluid that is positioned on the upper surface 44 of the base panel 42 drains through the base panel 42 and collects in the well 48. The well 48 may have a height of at least 24.0 inches to facilitate collection of the fluid.

The base panel 42 may be coupled to one or more of the front wall 16, the back wall 20, the pair of side walls 18, and the pair of arcuate walls 22. In some embodiments, the base panel 42 may be removably coupled to one or more of the front wall 16, the back wall 20, the pair of side walls 18, and the pair of arcuate walls 22 to facilitate access to the well 48. Because hazardous materials may be relatively heavy, particularly when multiple containers of hazardous materials are present, the base panel 42 may be coupled to the housing 12 by a means that is configured to support 350.0 pounds or more of weight over the well 48.

Generally, a pair of doorways 32 is positioned in the front wall 16 to permit access to the interior space 24. A lower edge 68 of each of the pair of doorways 32 is generally elevated from a bottom edge 70 of the front wall 16. Thus, the pair of doorways 32 facilitates access to the interior space 24 where hazardous materials may be stored without facilitating exposure to the fluid or other substances collected in the well 48. In some embodiments, a single doorway may be positioned in the front wall 16.

A pair of doors 34 may be movably coupled to the pair of doorways 32. The pair of doors 34 is positionable to cover a respective one of the pair of doorways 32 to inhibit access to the interior space 24. For example, each of the pair of doors 34 may be slidable inwardly toward a midsection 36 of the front wall 16 to open the respective one of the pair of doorways 32. In some such embodiments, a first one of the pair of doors 38 may slide behind a second one of the pair of doors 40 when the first one of the pair of doors 38 is opened and the second one of the pair of doors 40 may slide in front of the first one of the pair of doors 38 when the second one of the pair of doors 40 is opened. In some embodiments, a single door may be movably coupled to the pair of doorways 32. In other embodiments, a single door may be movably coupled to the single doorway described above.

A handle 60 may be coupled to each of the pair of doors 34. A lock 62 may also be coupled to each of the pair of doors 34. The lock 62 may releasably engage a respective one of the pair of side walls 18 when a respective one of the pair of doors 34 is closed and the lock 62 is positioned in a locking condition thereby inhibiting the respective one of the pair of doors 34 from being opened. The lock 62 may disengage the respective one of the pair of side walls 18 when the lock 62 is positioned in an unlocking condition thereby facilitating the respective one of the pair of doors 34 in being opened.

Hazardous materials, particularly fuel and gasoline fluids, can expel strong smelling or dangerous odors. Accordingly, a vent 64 may extend through one or more of the pair of doors 34 to facilitate airflow into and out of the interior space 24. In embodiments, a grille 66 may cover the vent 64.

A spout 50 may be coupled to and extend outwardly from a first side wall of the pair of side walls 18. The spout 50 is generally positioned adjacent to the bottom surface 28 of the interior space 24 and is generally positioned beneath the base panel 42. The spout 50 has an outer edge 52 defining an opening 54 into the spout 50. The opening 54 is in fluid communication with the well 48 whereby the spout 50 is configured to drain the fluid from the well 48 outwardly through the opening 54.

A valve 56 may be coupled to the spout 50. The valve 56 is generally movable between an open position and a closed position. The fluid can flow outwardly through the opening 54 when the valve 56 is in the open position. The fluid is inhibited from flowing outwardly through the opening 54 when the valve 56 is in the closed position. In some embodiments, the valve 56 comprises a turn-ball valve.

A plurality of shelves 58 may be positioned within the interior space 24. The plurality of shelves 58 is coupled to one or more of the pair of side walls 18, the back wall 20, and the pair of concavely arcuate walls 22 whereby each of the plurality of shelves 58 is configured to support a weight of an item over the base panel 42. For example, the plurality of shelves 58 may be used to store 20.0 L drums of fluid materials. That volume of gasoline can weigh over 30.0 pounds, while the same volume of water can weigh over 40.0 pounds. The plurality of shelves 58 may be arranged between the base panel 42 and the top surface 26 of the interior space 24. Each of the plurality of shelves 58 is generally spaced from an adjacent one of the plurality of shelves 58, for example by between 15.0 inches and 25.0 inches.

In use, the housing 14 is generally configured to fit between the pair of water tanks 12, making the space between the pair of water tanks 12 more useful. In embodiments such as that shown in FIG. 8, the housing 14 may thus have a height that is the same as a height of the pair of water tanks 12. The housing 14 can be used to store hazardous materials used in conjunction with the pair of water tanks 12 or used elsewhere on the property where the pair of water tanks 12 are located. The housing 14 may also be used to store equipment or other materials.

In some embodiments, a first housing 14 may be positioned on a first side of the pair of water tanks 12, and a second housing 14 may be positioned on the opposite side of the pair of water tanks 12. The back wall 20 of the first housing 14 may be aligned with and positioned proximate to the back wall 20 of the second housing 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A storage system comprising:

a pair of water tanks being spaced from each other;

a housing having a front wall being attached to and extending between a pair of side walls, a back wall, and a pair of arcuate walls being attached to and extending between the back wall and a respective one of the pair of side walls to define an interior space having a top surface and a bottom surface, each of the pair of arcuate walls having a shape being complementary to a shape of a respective one of the pair of water tanks whereby each of the pair of arcuate walls is positionable adjacent to the respective one of the pair of water tanks when the housing is positioned between the pair of water tanks;

a doorway being positioned in the front wall to permit access to the interior space; and a door being movably coupled to the doorway, the doors being positionable to cover the doorway to inhibit access to the interior space.

2. The storage system of claim 1, the doorway further comprising a pair of doorways, the door further comprising a pair of doors, each of the pair of doors being movably coupled to a respective one of the pair of doorways.

3. The storage system of claim 2, wherein each of the pair of doors is slidable inwardly toward a midsection of the front wall to open the respective one of the pair of doorways.

4. The storage system of claim 2, wherein a first one of the pair of doors slides behind a second one of the pair of doors when the first one of the pair of doors is opened, and wherein the second one of the pair of doors slides in front of the first one of the pair of doors when the second one of the pair of doors is opened.

5. The storage system of claim 1, further comprising a base panel being positioned in the interior space, an upper surface of the base panel being elevated over the bottom surface, the base panel being spaced from the bottom surface thereby defining a well between the base panel and the bottom surface of the interior space.

6. The storage system of claim 5, the base panel further comprising a mesh material whereby a fluid being positioned on the upper surface of the base panel drains through the base panel and collects in the well.

7. The storage system of claim 5, wherein the well has a height of at least 24.0 inches.

8. The storage system of claim 5, further comprising a spout being coupled to and extending outwardly from a first side wall of the pair of side walls, the spout being positioned adjacent to the bottom surface of the interior space and being positioned beneath the base panel, the spout having an outer edge defining an opening into the spout, the opening being in fluid communication with the well whereby the spout is configured to drain a fluid from the well outwardly through the opening.

9. The storage system of claim 8, further comprising a valve being coupled to the spout, the valve being movable between an open position and a closed position, wherein the fluid flows outwardly through the opening when the valve is in the open position, wherein the fluid is inhibited from flowing outwardly through the opening when the valve is in the closed position.

10. The storage system of claim 1, further comprising a plurality of shelves being positioned within the interior space, the plurality of shelves being coupled to one or more of the pair of side walls, the back wall, and the pair of concavely arcuate walls whereby each of the plurality of shelves is configured to support a weight of an item over the bottom surface.

11. The storage system of claim 10, wherein the plurality of shelves is arranged between the bottom surface and the top surface of the interior space.

12. The storage system of claim 11, wherein each of the plurality of shelves is spaced from an adjacent one of the plurality of shelves by between 15.0 inches and 25.0 inches.

13. The storage system of claim 1, further comprising a handle being coupled to the door.

14. The storage system of claim 1, further comprising a lock being coupled to the door, the lock releasably engaging the a respective one of the pair of side walls when the door is closed and the lock is positioned in a locking condition thereby inhibiting the door from being open, the lock disengaging the respective one of the pair of side walls when the lock is positioned in an unlocking condition thereby facilitating the door in being opened.

15. The storage system of claim 1, each of the pair of water tanks further comprising a plastic material, the housing further comprising the plastic material.

16. The storage system of claim 1, wherein the housing has a height being the same as a height of the pair of water tanks.

17. A storage system comprising:

a pair of water tanks being spaced from each other, each of the pair of water tanks being cylindrical;

a housing having a front wall being attached to and extending between a pair of side walls, a back wall, and a pair of arcuate walls being attached to and extending between the back wall and a respective one of the pair of side walls to define an interior space having a top surface and a bottom surface, wherein each of the pair of arcuate walls has a shape being complementary to a shape of a convexly arcuate perimeter wall of a respective one of the pair of water tanks, the pair of arcuate walls being concavely arcuate between the back wall and the respective one of the pair of side walls whereby each of the pair of arcuate walls contacts the convexly arcuate perimeter wall of the respective one of the pair of water tanks when the housing is positioned between the pair of water tanks, the housing comprising a plastic material;

a pair of doorways being positioned in the front wall to permit access to the interior space;

a pair of doors, each of the pair of doors being movably coupled to a respective one of the pair of doorways, the pair of doors being positionable to cover the respective one of the pair of doorways to inhibit access to the interior space, each of the pair of doors being slidable inwardly toward a midsection of the front wall to open the respective one of the pair of doorways, wherein a first one of the pair of doors slides behind a second one of the pair of doors when the first one of the pair of doors is opened, and wherein the second one of the pair of doors slides in front of the first one of the pair of doors when the second one of the pair of doors is opened;

a handle being attached to each of the pair of doors;

a lock being coupled to each of the pair of doors, the lock releasably engaging a respective one of the pair of side walls when a respective one of the pair of doors is closed and the lock is positioned in a locking condition thereby inhibiting the respective one of the pair of doors from being open, the lock disengaging the respective one of the pair of side walls when the lock is positioned in an unlocking condition thereby facilitating the respective one of the pair of doors to being opened;

wherein a vent extends through one or more of the pair of doors, the vent facilitating airflow into and out of the interior space;

a grille covering the vent;

a base panel being positioned in the interior space, an upper surface of the base panel being elevated over the bottom surface, the base panel being coupled to one or more of the front wall, the back wall, the pair of side walls, and the pair of arcuate walls, the base panel being spaced from the bottom surface thereby defining a well between the base panel and the bottom surface of the interior space, the base panel comprising a mesh material whereby a fluid being positioned on the upper surface of the base panel drains through the base panel and collects in the well, the well having a height of at least 24.0 inches;

a spout being coupled to and extending outwardly from a first side wall of the pair of side walls, the spout being positioned adjacent to the bottom surface of the interior space and being positioned beneath the base panel, the spout having an outer edge defining an opening into the spout, the opening being in fluid communication with the well whereby the spout is configured to drain the fluid from the well outwardly through the opening;

a valve being coupled to the spout, the valve being movable between an open position and a closed position, wherein the fluid flows outwardly through the opening when the valve is in the open position, wherein the fluid is inhibited from flowing outwardly through the opening when the valve is in the closed position, the valve comprising a turn-ball valve; and a plurality of shelves being positioned within the interior space, the plurality of shelves being coupled to one or more of the pair of side walls, the back wall, and the pair of concavely arcuate walls whereby each of the plurality of shelves is configured to support a weight of an item over the base panel, the plurality of shelves being arranged between the base panel and the top surface of the interior space, each of the plurality of shelves being spaced from an adjacent one of the plurality of shelves by between 15.0 inches and 25.0 inches.

* * * * *